United States Patent [19]

Vives

[11] E Patent Number: Re. 32,529

[45] Reissued Date of Patent: Oct. 27, 1987

[54] PROCESS FOR THE ELECTROMAGNETIC CASTING OF METALS INVOLVING THE USE OF AT LEAST ONE MAGNETIC FIELD WHICH DIFFERS FROM THE FIELD OF CONFINEMENT

[75] Inventor: Charles Vives, Chateaurenard, France

[73] Assignee: Aluminum Pechiney, France

[21] Appl. No.: 865,375

[22] Filed: May 21, 1986

Related U.S. Patent Documents

Reissue of:

[64] Patent No.: 4,530,404
Issued: Jul. 23, 1985
Appl. No.: 511,397
Filed: Jul. 7, 1983

[30] Foreign Application Priority Data

Jul. 23, 1982 [FR] France ..... 82 13220

[51] Int. Cl.[4] ..... B22D 27/02

[52] U.S. Cl. ..... 164/467; 164/503; 164/499

[58] Field of Search ..... 164/467, 503, 147.1, 164/498

[56] References Cited

U.S. PATENT DOCUMENTS 4,319,625 3/1982 Kindlmann et al. ..... 164/467
4,544,016 10/1985 Yetselev et al. ..... 164/467

*Primary Examiner*—Kuang Y. Lin
*Attorney, Agent, or Firm*—Jones, Day, Reavis & Pogue

[57] ABSTRACT

The present invention relates to a process for the electromagnetic casting of metals. The process is characterized by simultaneously using a stationary field and a variable field at a suitable frequency for producing both radial vibrations within the metal which is not yet in a solidified condition and limiting agitation of the metal. The invention can be used in any circumstance where both the structure and the surface condition of the cast products are to be improved.

7 Claims, 2 Drawing Figures

PROCESS FOR THE ELECTROMAGNETIC CASTING OF METALS INVOLVING THE USE OF AT LEAST ONE MAGNETIC FIELD WHICH DIFFERS FROM THE FIELD OF CONFINEMENT

Matter enclosed in heavy brackets [ ] appears in the original patent but forms no part of this reissue specification; matter printed in italics indicates the additions made by reissue.

The present invention relates to a process for the electromagnetic casting of metals involving the use of at least one magnetic field which differs from the field of confinement.

It is known from French patent No. 1 509 962 that steel or aluminium ingots can be produced by electromagnetic casting. That procedure comprises generating an alternating electromagnetic field around a column of metal in a molten condition, by means of an angular inductor.

The magnetic field provides a means of inducing electromagnetic pressure within the primary casting area to prevent the molten metal from spreading and thus impart a certain geometry to the metal.

When the metal, confined in that manner, is subjected to a cooling effect by a suitable cooling agent, it then solidifies, following the form imposed by the field.

Unlike the conventional casting process, solidification does not occur in contact with the walls of a mould, but outside of any contact with a solid material. Under those circumstances, the articles produced are generally ingots which have a better surface condition and which, in some cases, may be used directly in dimensional transformation operations without the need to have recourse to particular surface treatments, such as for example a scalping operation.

However, the application of that procedure is not without its disadvantages. It has been found in fact that the electromagnetic field of confinement causes excessive agitation and mixing, and vortices or eddies in the liquid metal. In the course of cooling, that results on the one hand in a degree of instability in the crystallisation process, which results in heterogeneity of structure and the occurrence of grains of different morphologies, and on the other hand, gives rise to the occurrence of pits at the surface of the ingots, which are partly due to dislocation of the film of oxide covering the metal, and the dissemination thereof in the mass of metal while still in a liquid condition.

The applicants, being aware of the advantages which are achieved nonetheless by electromagnetic casting, sought to remedy those defects.

Several series of tests enabled the applicants to develop a process in which at least one magnetic field different from the variable field of confinement is caused to act, during the casting operation, and which is distinguished by simultaneously using a stationary field and a variable field at a suitable frequency for both producing radial vibrations within the metal which is not yet in a solidified condition and for limiting the agitation and mixing effect.

In electromagnetic casting, the liquid metal is held in a confined condition by applying an electromagnetic field which is generated by means of an annular inductor supplied with an alternating current at a frequency which is generally between 500 and 5000 Hertz. The inductor exerts its action on the liquid metal which is supplied by means of a distributor feed assembly and which issues in the form of a column at the lower part of a screen means which is of substantially similar section to the ingot to be cast, and has the same axis.

The above-mentioned action is revealed not only by the confinement effect but also by rotary movements of the liquid metal at the periphery of the ingot in a plane passing through the axis thereof and directed in an upward direction on moving away from the axis.

The process according to the invention involves using both a stationary field and a variable field at a suitable frequency for both producing radial vibrations within the metal which still not in a solid condition, and limiting the mixing effect.

The stationary field is in a substantially vertical direction and is generated by an annular coil supplied with continuous current, comprising a number of turns sufficient to attain values of less than 0.5 tesla. The horizontal section of the coil is similar to that of the screen means and it is disposed above the latter and concentrically with respect to the axis of the ingot. The field may be modified by the addition of an iron core of annular shape, within the coil.

Under the combined action of that field and the field of confinement, it is already found that a beneficial effect on the surface condition and on the structure and homogeneity of the metal in the cortical zone of the cast product is achieved.

However, the invention is not limited to just the application of a stationary field, but also that of a variable field at a suitable frequency for producing radial vibrations and limiting the mixing effect.

The variable field, which is in a direction parallel to the axis of the ingot, is produced by means of a coil which is supplied with an alternating current at a low frequency, that is to say, between 5 and 100 Hertz. It will be appreciated that, for reasons of convenience, the industrial frequency of 50 Hz is usually used.

That coil, which is also an annular coil, is disposed concentrically within the coil that is supplied with direct current, and at a mean height which is at the limit between the screen means and the coil supplied with direct current. It is possible for that coil to be omitted, by supplying the screen means directly with alternating current, so that it then becomes the variable field operator, that substitution making it easier to introduce an iron core in the direct current coil.

By virtue of the low frequency used, the variable field which is generated either by the coil or by the screen means extends its electromagnetic action to the whole of the liquid metal, whereby the rotational movement of the metal is no longer limited to the vicinity of the periphery of the ingot, as with the confinement field, but occurs as far as the axis of the ingot. In addition, the rotational movement is in the opposite direction to the movement produced by the confinement field; the result of such antagonistic effects is a reduction in the magnitude of the eddy effect and the mixing action which are found to take place in conventional electromagnetic casting. That action, which therefore involves the entire section of the ingot, results in refining of the grain of the metal and a higher degree of homogeneity in crystallisation. Correlatively, the speed of transfer of the metal in the eddies decreases and dislocation of the oxide skin, even if it is not completely eliminated, is no longer followed by general dissemination within the metal of the particles resulting therefrom, hence reducing the pitting phenomena.

However, the variable field also performs other functions. It gives rise in the metal to an induced current, the lines of force of which are concentric circles. Under the combined action of the stationary field and the induced current, forces which are radial in direction and of a frequency N equal to the frequency of the variable field are developed. Likewise, by virtue of interaction of the variable field and the induced current, both at a frequency N, variable radial forces are also created, but at a frequency 2N. Such forced vibrations have the effect of refining the metal grain size.

In accordance with an alternative form of the invention, it is possible for the variable field to be generated by means of a coil supplied with an alternating current at a frequency of higher than 100 Hertz. In that case, the degree of penetration of the electromagnetic field into the metal will be reduced in proportion to increasing frequency. The combined action of the stationary field and the induced current is then greatly reduced and the forced vibrations are virtually non-existent.

Nonetheless, it is possible even so to produce vibration effects, by making use of resonance.

In fact, depending on the dimensions of the cast products, the rate of casting, and the nature of the metals and alloys used, there are vibration frequencies which are natural to the liquid metal, the dendrites in the course of formation, or the solid mass, the value of which frequencies can be deduced by calculation or by measurement using suitable detectors. Adjusting the frequency of the variable field to the value of such fundamental or harmonic frequencies develops the formation of resonance vibration, the effects of which on refining the metal grain size are also substantial.

In that case, it is not always necessary to have recourse to a special coil for generating the variable field as, under certain conditions, it is possible to produce the resonance phenomenon from the electromagnetic confinement field itself.

DESCRIPTION OF DRAWINGS

The invention will be better appreciated by reference to the drawings accompanying the present invention, in which:

Referring to FIG. 1, shown therein is a metal ingot 1, the upper part 2 of which is in a liquid condition. The ingot is surrounded by an inductor 3 which generates the electromagnetic confinement field, a screen means 4 and a cooling system 5. The field generates eddies or vortices 6 in the liquid metal.

FIG. 2 shows the same means as described above, together with the addition of the means according to the invention, namely an iron core 11, a core 7 which is supplied with direct current and a coil 8 which is supplied with alternating current. The field generated by the coil 8 produces circulation of the metal along the path indicated by 9, while radial vibrations are developed, as indicated at 10.

Figure 1:
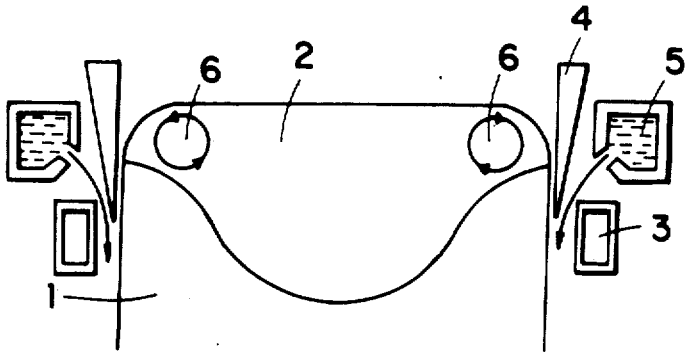
FIG. 1 PRIOR ART
FIG. 1 is a cross-sectional view through a vertical plane through the axis of the ingot, of an electromagnetic casting apparatus according to the prior art.
Figure 2:
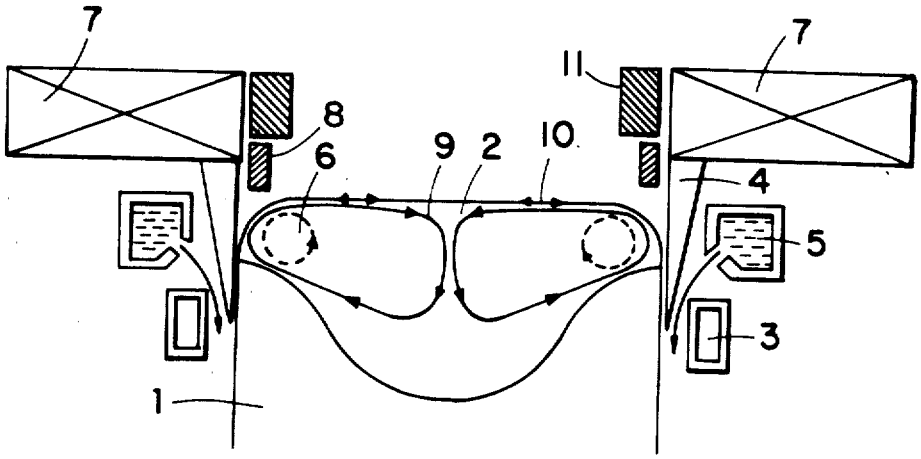
FIG. 2 is a cross-sectional view of the apparatus according to the invention.

The invention may be illustrated by reference to the following example.

A billet of $\phi$350 mm, of aluminium alloy 2024, refined with AT5B, in a proportion of 1 kg/tonne of aluminium, was cast. A first part was produced with the application of a confinement field at a frequency of 2000 Hertz, generated at a voltage of 28 volts and with a current strength of 4900 amperes.

The process according to the invention was applied to a second part, that is to say, an annular coil disposed above the screen means was supplied with direct current at a voltage of 24 volts, the current strength being 17500 ampere turns, to produce a stationary or steady field of 0.04 tesla. Another coil disposed within the first coil, at a height close to the top of the screen means, was supplied, at a voltage of 75 volts, with a current of 3800 ampere turns, at a frequency of 50 Hertz, to generate a variable field.

It was found that the second part of the billet had only dendritic equi-axis grains while the first part also included equi-axis grains without dendrites; in addition the number of grains had also been multiplied by 8, while the surface condition was substantially improved, being without either pitting or roughness.

The present invention can be used in the electromagnetic casting of metals and alloys in the form of plates, billets, ingots, etc., when both the structure and the surface condition of the cast products are to be improved.

I claim:

1. In a process for the electromagnetic casting of metals wherein an electromagnetic confinement field acts on molten metal in the course of solidification to contain and form said molten metal into a desired casting, the improvement comprising the steps of applying a stationary field to said molten metal, said stationary field being generated by an annular coil supplied with direct current, and simultaneously applying a variable field to said molten metal, said variable field being generated by an annular coil supplied with alternating current, said fields being applied to the molten metal to produce radial vibrations within the metal during solidification and to limit the agitation of the molten metal, thereby improving the structure and surface condition of the cast metal.

2. A process according to claim 1 characterised in that the stationary field is of a value of less than 0.5 tesla.

3. A process according to claim 1 characterised in that the stationary field is modified by the presence of an iron core.

4. A process according to claim 1 characterised in that the variable field is at a frequency of from 5 to 100,000 Hertz.

5. A process according to claim 1 characterised in that the variable field is supplied with an alternating current at a frequency between 100 and 100,000 Hertz, said frequency being adjusted to the natural frequencies of the liquid metal, the dentrites in the course of formation or the solid mass.

6. A process according to claim 1 characterised in that the lower part of the annular coil generating the stationary field is above the level of the liquid metal.

7. A process according to claim 1 characterised in that the annular coil generating the variable field is disposed concentrically within the coil generating the stationary field.

* * * * *